(12) United States Patent
de Cremoux et al.

(10) Patent No.: US 10,686,372 B2
(45) Date of Patent: Jun. 16, 2020

(54) SWITCHING POWER SUPPLY WITH LOW POWER CONSUMPTION

(71) Applicant: Dialog Semiconductor (UK) Limited, London (GB)

(72) Inventors: Guillaume de Cremoux, Edinburgh (GB); Andrew Notman, Edinburgh (GB); Vladislav Vasilev, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/712,237

(22) Filed: Sep. 22, 2017

(65) Prior Publication Data

US 2018/0131273 A1    May 10, 2018

(30) Foreign Application Priority Data

Nov. 8, 2016  (DE) .................... 10 2016 221 863

(51) Int. Cl.
*H02M 3/156* (2006.01)
*H02M 1/00* (2006.01)

(52) U.S. Cl.
CPC .......... *H02M 3/156* (2013.01); *H02M 3/1563* (2013.01); *H02M 2001/0032* (2013.01); *H02M 2001/0035* (2013.01); *Y02B 70/16* (2013.01)

(58) Field of Classification Search
CPC ............... H02M 3/156; H02M 1/4208; H02M 2001/4291; H02M 3/33592; H02M 3/3376; H02M 2001/0032; H02M 2001/0035; H02M 3/1563; G05F 1/567; G05F 1/463; G05F 1/462; G05F 3/225; G05F 3/245; G05F 3/222; G05F 3/242; Y02B 70/16
See application file for complete search history.

(56) References Cited

U.S. PATENT DOCUMENTS 6,137,324 A    10/2000  Chung
8,994,444 B2 *  3/2015  Baek .................... G05F 3/30
                                                      327/513

(Continued)

OTHER PUBLICATIONS

German Office Action, File No. 10 2016 221 863.8, Applicant: Dialog Semiconductor (UK) Limited, dated Sep. 14, 2017, 8 pgs, and English language translation, 9 pgs.

(Continued)

*Primary Examiner* — Nguyen Tran
*Assistant Examiner* — Demetries A Gibson
(74) *Attorney, Agent, or Firm* — Saile Ackerman LLC; Stephen B. Ackerman

(57) ABSTRACT

A power supply is disclosed. The power supply includes a switching converter for providing an output voltage comprising a power switch coupled to a driver for driving the power switch with an on-off switching cycle; and a voltage threshold indicator. The voltage threshold indicator includes an input for receiving an output of the converter, and an output coupled to the driver. The voltage threshold indicator is adapted to provide a temperature compensated voltage threshold, and a control signal to control the on-off switching cycle. The control signal is adapted such that when the output voltage exceeds the temperature compensated voltage threshold, a value of the control signal changes.

16 Claims, 10 Drawing Sheets

(56) References Cited

U.S. PATENT DOCUMENTS

| | | | | |
|---|---|---|---|---|
| 2004/0129863 | A1* | 7/2004 | Cheung | H01L 31/02027 250/214 C |
| 2005/0243894 | A1* | 11/2005 | Chen | H02M 1/44 375/139 |
| 2006/0043943 | A1* | 3/2006 | Huang | H02M 3/158 323/222 |
| 2009/0153124 | A1* | 6/2009 | Ishii | H02M 3/156 323/290 |
| 2010/0244800 | A1* | 9/2010 | Nakamura | H02M 1/32 323/284 |
| 2010/0320986 | A1* | 12/2010 | Collins | H02M 3/156 323/284 |
| 2011/0018507 | A1* | 1/2011 | McCloy-Stevens | H02M 3/1588 323/271 |
| 2011/0080118 | A1* | 4/2011 | Daniel | H05B 33/0815 315/297 |
| 2014/0084884 | A1 | 3/2014 | Lee | |
| 2015/0205314 | A1* | 7/2015 | Hayashi | G05F 1/56 323/217 |
| 2016/0164409 | A1* | 6/2016 | Beier | H02M 3/158 323/271 |
| 2017/0025961 | A1* | 1/2017 | Seeman | H02M 1/08 |
| 2017/0294839 | A1* | 10/2017 | de Cremoux | H02M 3/1588 |

OTHER PUBLICATIONS

VLSI Design Techniques for Analog and Digital Circuits, by Randall L. Geiger et al., pp. 370 and 371, McGraw-Hill Publishing Company 1990, ISBN 0-07-023253-9.

* cited by examiner

SWITCHING POWER SUPPLY WITH LOW POWER CONSUMPTION

TECHNICAL FIELD

The present disclosure relates to a switching power supply with low power consumption and a method of operating such a device. In particular, the present disclosure relates to a switching power supply comprising a buck converter.

BACKGROUND

Wearable devices, require careful power management in order to maximise battery autonomy.

Different approaches have been used in order to reduce the quiescent current of power converters such as DC-DC buck converters. For example, a power consumption of the power converter circuit can be reduced by momentarily switching off the controller of the power converter under light load conditions. However, the power consumption of such circuits remains significant with a quiescent current in the order of 1 µA to 15 µA. In addition, such systems have a complex design and a large footprint unsuitable for wearable device applications.

It is an object of the invention to address one or more of the above mentioned limitations.

SUMMARY

According to a first aspect of the disclosure there is provided a power supply comprising a switching converter for providing an output voltage comprising a power switch coupled to a driver for driving the power switch with an on-off switching cycle; and a voltage threshold indicator, the voltage threshold indicator comprising an input for receiving an output of the converter, and an output coupled to the driver, the voltage threshold indicator being adapted to provide a temperature compensated voltage threshold, and a control signal to control the on-off switching cycle, wherein the control signal is adapted such that when the output voltage exceeds the temperature compensated voltage threshold, a value of the control signal changes.

Optionally, the output control signal may be adapted to regulate the output voltage around a set value.

Optionally, the output control signal may be adapted to change an operation of the switching converter between a first state in which the power switch is switched on and off alternately, and a second state in which the power switch is switched off.

Optionally, the output control signal may be adapted to change the operation of the switching converter from the first state to the second state when the output voltage increases beyond a threshold value.

Optionally, the power supply comprises a feedback loop for regulating the output of the converter, the feedback loop comprising a memory device coupled to the driver.

Optionally, the feedback loop comprises the voltage threshold indicator, and the output of the voltage threshold indicator is coupled to an input of the memory device.

Optionally, the voltage threshold indicator may be adapted to provide hysteretic control of the switching converter.

Optionally, the power supply comprises at least one energy consuming circuit element.

Optionally, the at least one energy consuming circuit element comprises a current comparator.

Optionally, the power supply comprises a controller coupled to the output of the voltage threshold indicator; the controller being switchable between a first state in which the controller outputs a first control signal to turn on at least one energy consuming circuit element, and a second state in which the controller outputs a second control signal to turn off at least one energy consuming circuit element.

Optionally, the voltage threshold indicator comprises a resistance proportional to absolute temperature, a first current mirror coupled to a second current mirror, wherein a size of the second current mirror is a number of times a size of the first current mirror, wherein the number is at least 2 or more.

Optionally, the voltage threshold indicator comprises a current copier, wherein the first current mirror is coupled to the second current mirror via the current copier, and a potential divider comprising an input coupled to the first current mirror and an output coupled to the current copier.

Optionally, the voltage threshold indicator comprises another switch having a first terminal coupled to the first current sensor and a second terminal coupled to the resistance proportional to absolute temperature.

Optionally, the potential divider comprises a variable resistor; and the voltage threshold indicator comprises a comparator circuit coupled between the first current mirror and the variable resistor, the comparator circuit being adapted to output a signal to change a value of the variable resistor.

According to a second aspect of the disclosure there is provided a method of operating a power supply comprising a switching converter for providing an output voltage, the method comprising providing a voltage threshold indicator adapted to provide a temperature compensated voltage threshold and a control signal, the control signal being adapted such that when the output voltage exceeds the temperature compensated voltage threshold a value of the control signal changes; and controlling an on-off switching cycle of the switching converter using the control signal.

Optionally, the method comprises regulating the output voltage of the switching converter around a set value using the control signal.

Optionally, the method comprises changing an operation of the switching converter between a first state in which the power switch is switched on and off alternately, and a second state in which the power switch is switched off.

Optionally, changing the operation of the switching converter from the first state to the second state occurs when the output voltage increases beyond a threshold value.

Optionally, the method comprises providing a controller comprising an input coupled to the voltage threshold indicator and an output coupled to at least one energy consuming circuit element; and turning off at least one energy consuming circuit element when the output voltage increases beyond the threshold value.

Optionally, the method comprises turning on at least one energy consuming circuit element when the output voltage decreases below another threshold value.

BRIEF DESCRIPTION OF THE DRAWINGS

The disclosure is described in further detail below by way of example and with reference to the accompanying drawings, in which.

DESCRIPTION

Figure 1:
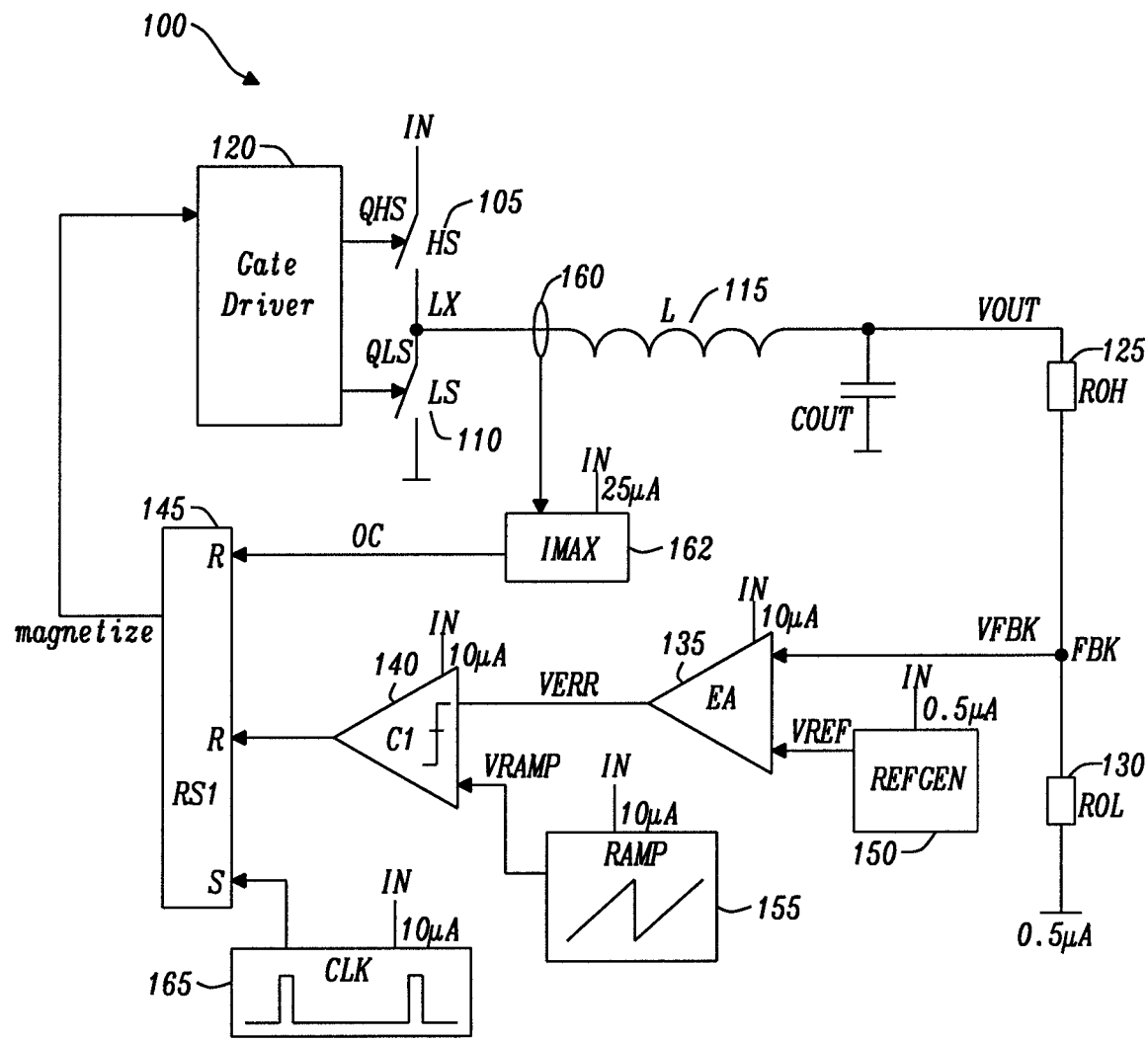
FIG. 1 is a circuit diagram of a buck converter.

FIG. 1 illustrates a state of the art buck converter 100. The converter includes a high side power switch 105, a low side power switch 110, an inductor 115, a gate driver 120, and an output regulation loop for regulating an output voltage of the converter.

The output regulation loop includes a resistive ladder formed by resistors ROH, 125, and ROL, 130, an amplifier 135, a comparator 140 and a memory device 145. For example, the memory device 145 may be a latch or a flip flop. The amplifier 135 has a first input for receiving a feedback voltage $V_{FBK}$ from the resistive ladder, a second input for receiving a reference voltage $V_{REF}$ from a reference generator 150, and one output for providing an error signal, $V_{ERR}$. The comparator 140 has a first input for receiving the error signal from the amplifier 135, a second input for receiving a ramp signal from a ramp generator 155 and one output. The ramp generator 155 may be adapted to generate a ramp signal which may be a voltage ramp signal, $V_{RAMP}$, or a replica of the inductor current, or an integral of the Lx node or any other signal allowing for controlling duty-cycle modulation.

A current sensor 160 is coupled to the inductor 115 to sense an inductor current. The current sensor 160 is connected to a comparator 162 for indicating whether the inductor current exceeds a threshold value.

The memory device 145 has a first input for receiving an output of the current comparator 162, a second input for receiving an output of the comparator 140, a third input for receiving a clock signal from an oscillator 165; and an output connected to the gate driver 120. The memory device 145 may be a latch or a flip-flop.

In operation, the output voltage $V_{OUT}$ of the buck converter is divided by the resistive ladder. In the present disclosure the value of $V_{OUT}$ is 1.000V; however, the converter may be designed to output a different output voltage. The resulting voltage $V_{FBK}$ is compared to the reference voltage $V_{REF}$, and amplified by the amplifier 135. The amplifier 135 generates an error signal $V_{ERR}$ proportional to $V_{FBK}$-$V_{REF}$.

The current comparator 162 is adapted to compare the inductor current with a threshold value and to generate an error signal, OC, in case the inductor current exceeds the threshold value.

Each time a clock pulse is generated by the oscillator 165, an output of the memory device 145 is set to a logic 1. The logic 1 signal then activates the high side power switch 105 through the gate driver 120. The output voltage increases, and when the ramp signal reaches $V_{ERR}$, the output signal of the memory device is reset. This activates the low side power switch until the next clock pulse.

Such a buck converter consumes a significant amount of current, even in a quiescent state when there is no load on the output. In a continuous switching mode, also referred to as continuous condition mode CCM, the power switches are turned on/off at each clock cycle. Each power switch requires at each cycle a given amount of charge, for example 1 nC, to be turned on or off. In CCM mode and considering the example of a clock frequency of 2 MHz, each power switch consumes a quiescent current IQS=2 mA. This is considering a power switch having a 10 mΩ Ron resistance. With these values, the amplifier 135, the comparator 140, the ramp generator 155, the current sensor 160 and the oscillator 165, consume a controller quiescent current IQC=65 µA on the input, and 0.5 µA on the output. Therefore, in CCM mode the consumption of the controller is very small compared to the consumption of the switches.

Under light load conditions, the load draws a low current. In order to save power when operating under light load conditions, a buck converter can be operated in a discontinuous switching mode, also referred to as pulse frequency modulation, PFM mode.

Figure 2:
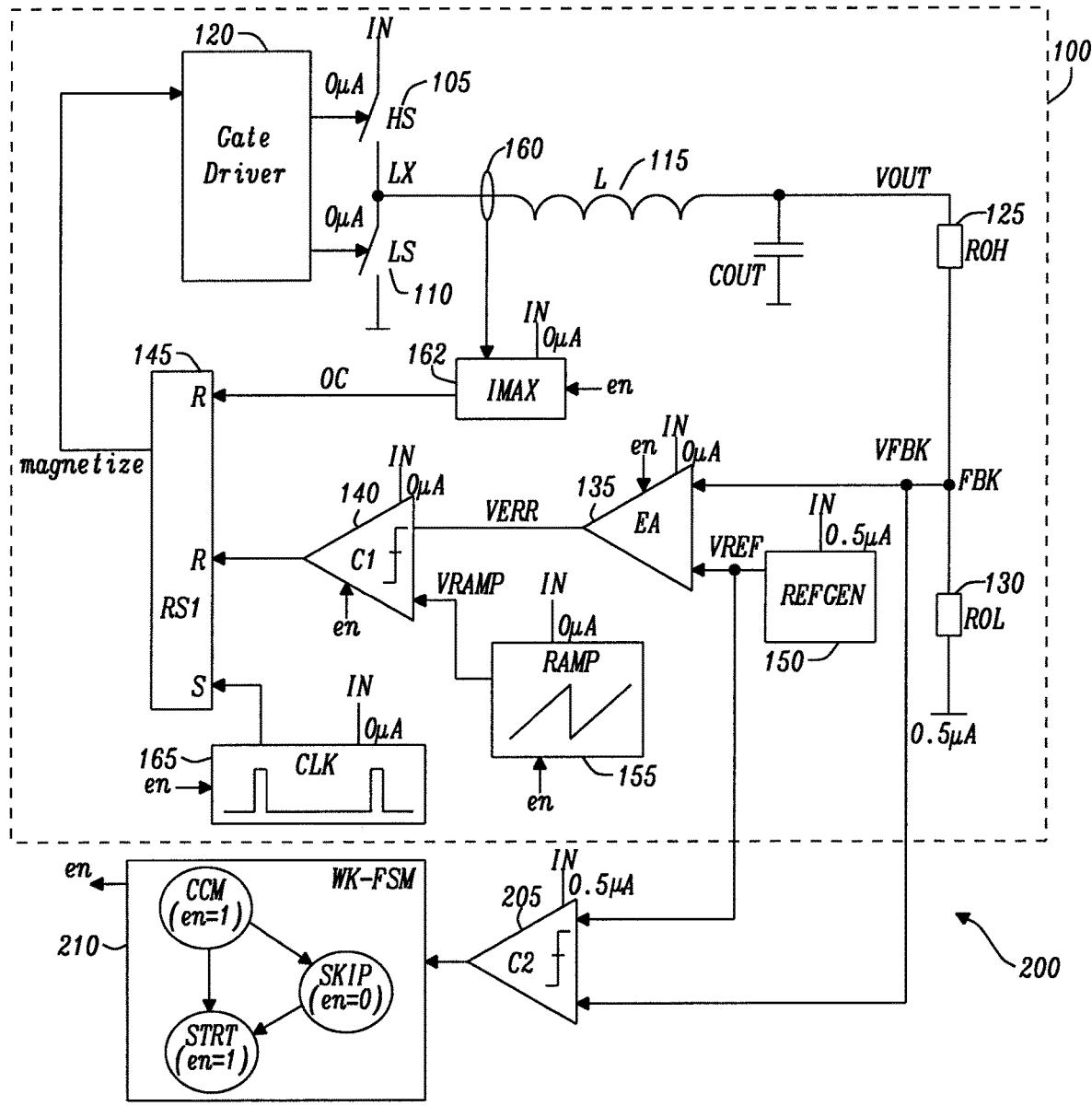
FIG. 2 is a circuit diagram of a buck converter provided with a digital controller.

FIG. 2 illustrates a buck converter provided with a digital controller for operating the buck converter in PFM mode. The buck converter is similar to the buck converter 100 of FIG. 1. The converter 200 includes an additional comparator C2 205, also referred to as skip comparator, having a first input for receiving a reference voltage, $V_{REF}$, from the reference generator, a second input for receiving the feedback voltage $V_{FBK}$, and an output coupled to a digital controller 210.

Under light load conditions, the output DC voltage $V_{OUT}$ is forced to a transient increase, which allows detection of the light load condition. The skip comparator C2 can be used to detect a light load, for example if $V_{OUT}$ exceeds 1.05V.

Upon detection of the light load condition, the digital controller 210 enters a pulse frequency modulation mode, PFM. In this mode of operation, the digital controller alternates between skip states and switching states.

In the skip state the output of the digital controller 210 is set to a logic 0. The high side 105 and low side 110 power switches are turned off. The amplifier 135, the comparator 140, the ramp generator 155, the current comparator 162 and the oscillator 165 are switched off. In the skip state, only the additional comparator 205, the resistive ladder 125, 130 and the reference generator 150 are consuming current.

When $V_{OUT}$ decreases below a certain value, for example 1V, the additional comparator C2, 205, outputs a signal which puts the digital controller 210 in a switching state. In the switching state the digital controller 210 outputs a logic 1 and the amplifier, the comparator 140, the ramp generator 155, the current comparator 162 and the oscillator 165 are switched on. The system can be restarted in a very short time, for example 100 ns.

When operating in PFM mode, the digital controller 210 remains in a skip state for most of the time. Since the quiescent current is much lower in the skip state than in the switching state, it is possible to reduce the overall quiescent current when operating in PFM mode. For example, a quiescent current of 1 µA (taken from the input) may be achieved in the skip state of the PFM mode.

However, the system design is complex and occupies a large die area. The resistive ladder 125, 130, the pulse-mode voltage reference 150 and the additional comparator 205, whose offset must match the offset of the amplifier 135, all contribute to the large size of the overall converter circuit.

The additional comparator 205 is also relatively slow and may take time to react in case $V_{OUT}$ suddenly drops because a high current load is suddenly applied on the output.

Figure 3:
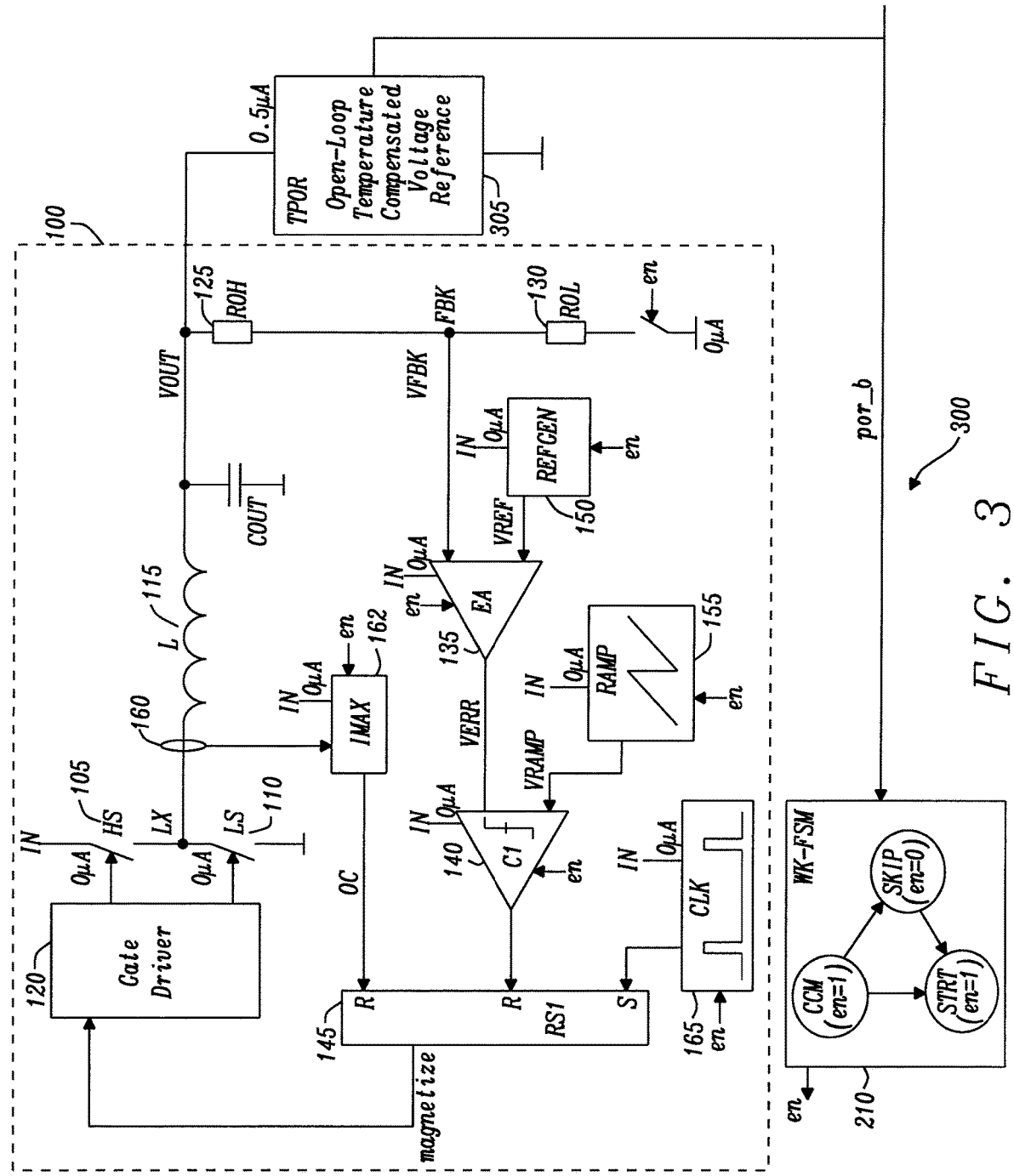
FIG. 3 is a circuit diagram of a buck converter provided with a voltage threshold indicator.

FIG. 3 illustrates a buck converter 300 provided with an additional regulation circuit 305. In this example the additional regulation circuit is a voltage threshold indicator provided by a temperature compensated Power-On-Reset, TPOR generator.

The TPOR generator 305 has a first input for receiving an output of the buck converter 100 and an output coupled to the digital controller 210.

The TPOR generator belongs to a family of temperature compensated voltage references that are derived from bandgap references. However, such devices generate a regulated supply voltage different from the conventional 1.20V bandgap voltage. TPOR generators are derived from closed loop topologies, in which the output of the generator is coupled to its input. A precise and temperature-compensated single-level voltage indicator may be obtained by opening the regulation loop.

The digital controller 210 may be operated in PFM mode based on an output of the TPOR generator. Upon detection of the light load condition, the TPOR generator 305 outputs a logic signal referred to as por_b signal, for example a logic 1 which turns the digital controller 210 to the skip state of the PFM mode. In the skip state, the output of the digital controller 210 is set to a logic 0. The amplifier 135, the comparator 140, the ramp generator 155, the current comparator 162, the oscillator 165, the reference voltage generator 150 and the resistive ladder 125, 130 are switched off.

When $V_{OUT}$ decreases below a certain value, for example 1V, the TPOR generator outputs a por_b signal, for example a logic 0, to turn the digital controller 210 to the switching state of the PFM mode. The digital controller 210 outputs a logic 1. The amplifier 135, the comparator 140, the ramp generator 150, the current comparator 162, the oscillator 165, the reference voltage generator 150 and the resistive ladder 125, 130 are switched on.

Using this approach, it is possible to reduce the quiescent current. For example, assuming a $V_{OUT}$=1V, and a $V_{IN}$ of 3.6V, the current consumed by the TPOR generator is 0.5 μA, corresponding to an input quiescent current in the skip state of the PFM mode of 140 nA.

In addition, the size of the buck converter is also reduced. This is because there is no need for the comparator 205, and the resistances ROH 125 and ROL 130 of the resistive ladder can also have smaller values, hence reduced sizes. The circuit of FIG. 3 is therefore suitable for low-consumption and small size applications, such as wearable devices applications. However, the design of the system remains relatively complex. For example, a level at which the TPOR generator sets/resets the por_b signal should be matched with a main regulation level achieved using the reference generator 150 and the amplifier 135.

Figure 4:
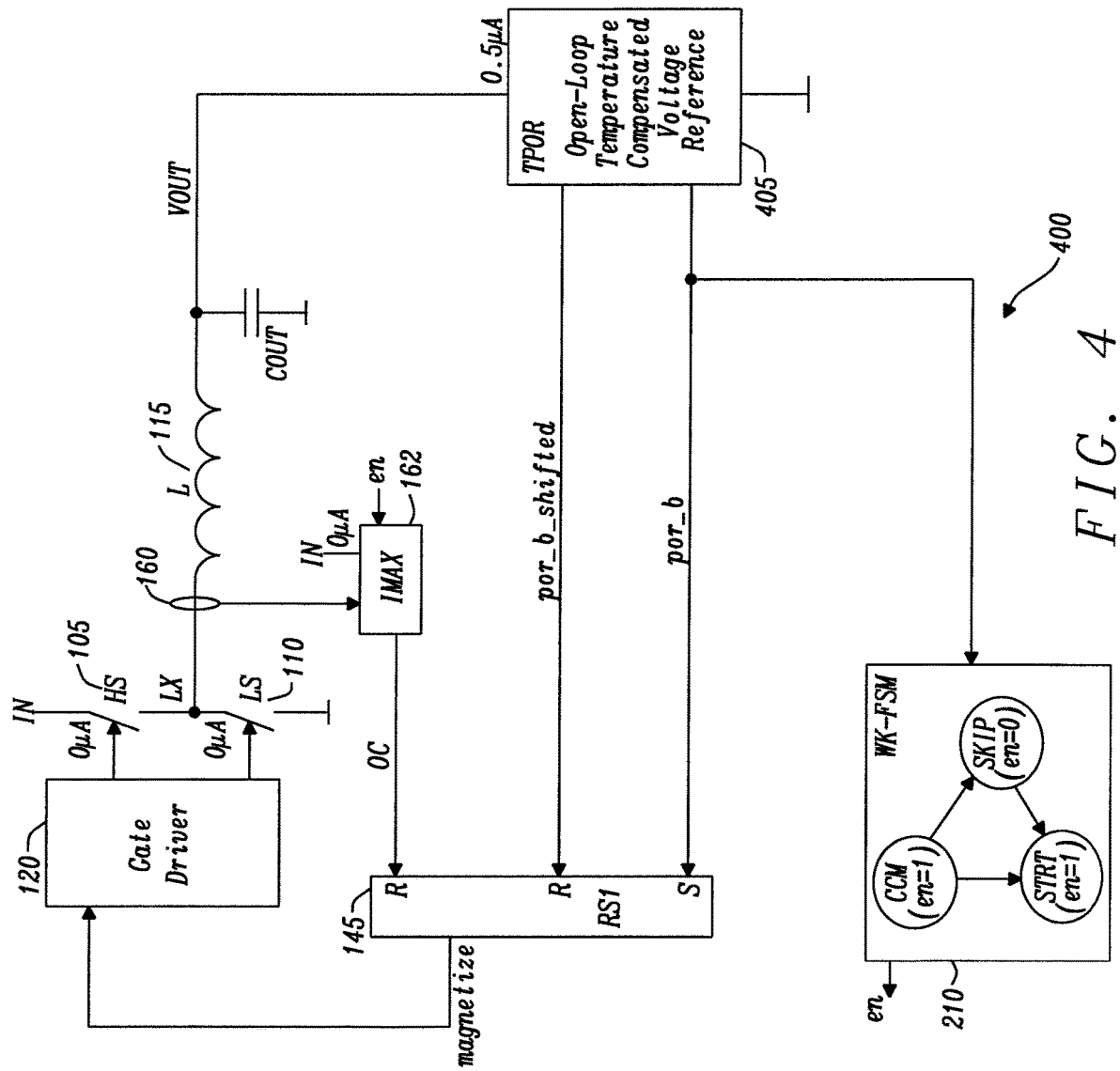
FIG. 4 is another circuit diagram of a buck converter provided with a voltage threshold indicator.

FIG. 4 illustrates another buck converter topology allowing further reduction in size of the system. As compared with FIG. 3, the voltage threshold indicator 405 has a first input for receiving an output of the buck converter and two outputs for providing a first logic signal, referred to as por_b and a second logic signal referred to as por_b-shifted. The first output is coupled to a first input of the memory device 145. The second output is coupled to a second input of the memory device and optionally to the digital controller 210.

In this case, the voltage threshold indicator 405 is a TPOR generator that is used to provide hysteretic control of the buck converter. The TPOR generator is also used for operating the buck converter in continuous CCM mode under heavy load condition and in discontinuous PFM mode under light load condition.

By using a voltage threshold indicator that is temperature compensated in order to regulate the output voltage of the switching converter, it is possible to perform voltage regulation reliably across a wide range of temperatures. In other word the voltage output of the switching converter will not be affected by temperature variations.

Figure 5:
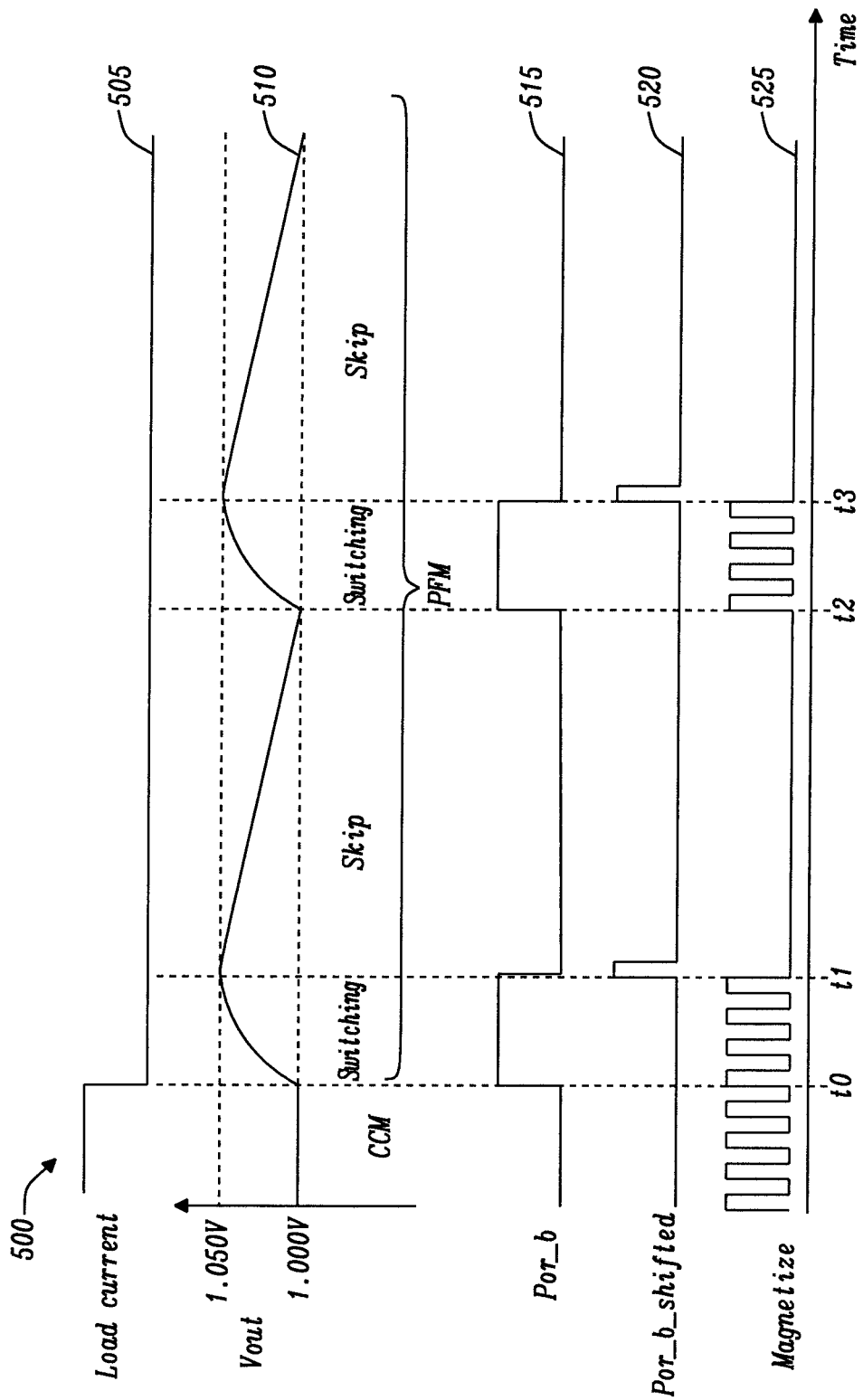
FIG. 5 is a timing chart illustrating the working of the circuit of FIG. 4.

FIG. 5 shows a timing chart that includes the profiles of an idealised load current 505, the output voltage $V_{OUT}$, 510, of the buck converter, the por_b signal 515, the por_b shifted signal 520 of the TPOR generator, and the logic signal 525 of the memory device 145, also referred to as a magnetize signal.

Before time t0, the load current 505 is high, and the buck converter is operated in continuous CCM mode. In this scenario the TPOR circuit maintains the output voltage of the converter around a regulated value, for example 1V.

At time t0 the load current 505 decreases below a threshold value indicating a light load condition. Under light load condition the converter is operated in discontinuous PFM mode. When the output voltage $V_{OUT}$ becomes equal to a minimum threshold value, for example 1V, the TPOR generator sets the por_b signal to a high value, for example a logic 1. This sets the memory device 145 which outputs a signal 525.

Between times t0 and t1, the high side power switch 105 is switched ON/OFF following the magnetize signal 525 via the gate driver 120. During this time period, the output voltage 510 increases, from 1V to 1.05 V. FIG. 5 shows a magnetize signal comprising four pulses between times t0 and t1. The number of pulses between the times t0 and t1 may be adjusted in order to reach the desired voltage $V_{OUT}$. In some applications a single pulse may be sufficient in order to increase $V_{OUT}$ to the desired value, for example 1.05V.

At time t1, the TPOR generator sets the por_b_shifted signal to a high value, for example a logic 1 for a relatively short time, hence resetting the memory device 145.

Between times t1 and t2, the high side power switch 105 is switched OFF (open) and $V_{OUT}$ decreases from 1.05V to 1V.

At time t2, $V_{OUT}$ reaches 1V, the TPOR generator 405 sets the por_b signal to a logic 1, which sets the memory device 145.

Between times t2 and t3, the high side power switch 105 is switched ON/OFF following the magnetize signal 525, via the gate driver 120. The output voltage $V_{OUT}$ 510 increases, from 1V to 1.05 V.

At time t3, $V_{OUT}$ reaches 1.05V, the TPOR generator sets the por_b_shifted signal to a logic 1, thus resetting the memory device.

Therefore, under light load condition the buck converter can be operated in a discontinuous PFM mode which alternates switching states and skip states. The switching state may last for a switching time period much shorter than a skip time period associated with the skip state. The switching time period may be many orders of magnitude shorter than the skip time period. For example, the switching time period t1-t0 may be about 10 μs and the skip time period t2-t1 may be about 10 ms.

Under light load condition, the TPOR circuit maintains the output voltage of the converter around an average value, for example 1.025V.

Using this approach, the output voltage regulation of the buck converter is supported by a single voltage threshold indicator such as a TPOR generator, thus reducing the number of elements and the overall size of the circuit.

Optionally, the por_b signal generated by the TPOR generator is also received at the digital controller 210. When the por_b signal is high, the digital controller 210 outputs a logic 1 and the current sensor 160 is switched on. When the por_b signal is low, the digital controller 210 outputs a logic 0, and the current comparator 162 is switched off to save energy.

Figure 6:
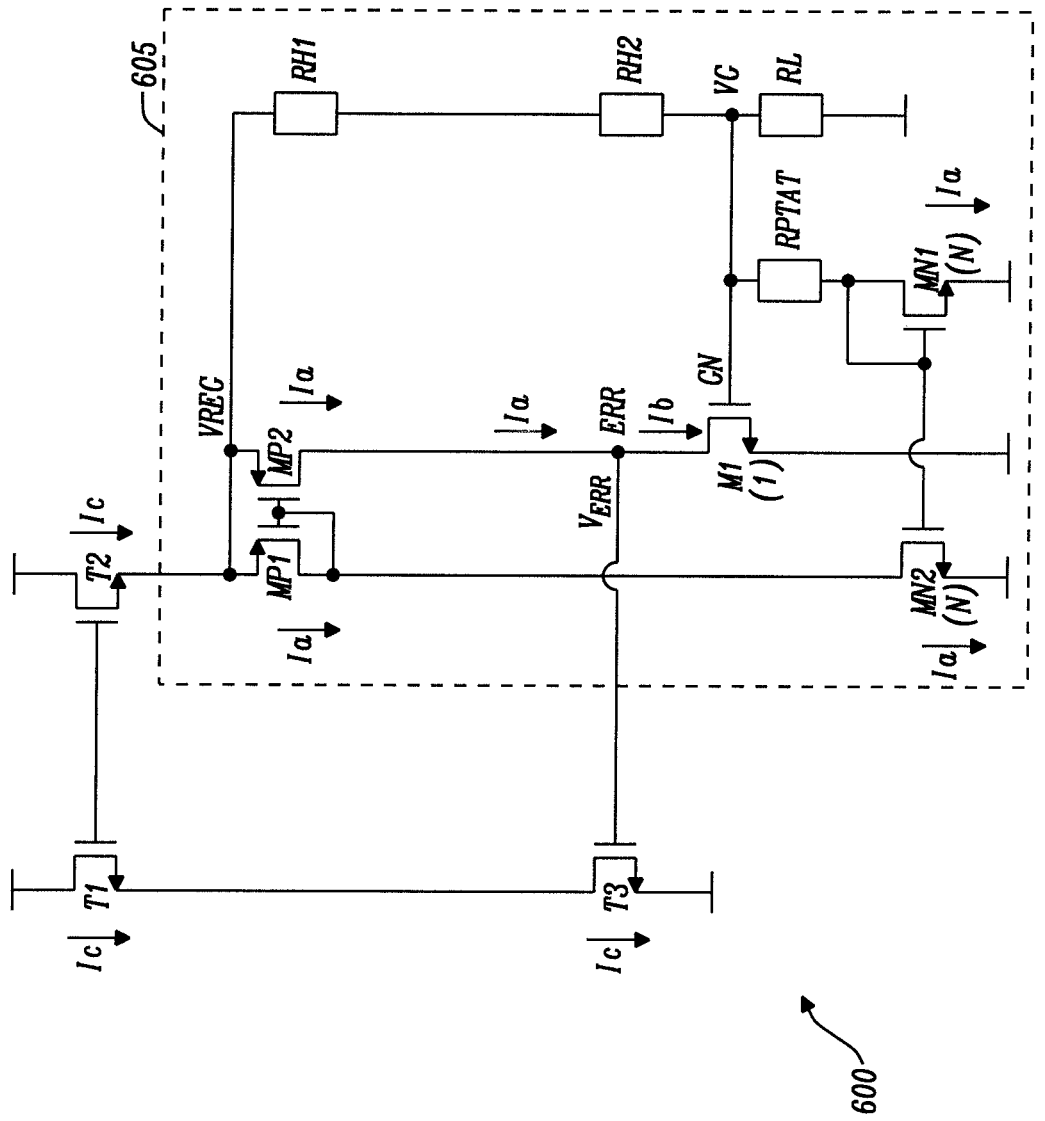
FIG. 6 is a circuit diagram of a voltage threshold indicator.

FIG. 6 shows a circuit diagram of a voltage threshold indicator 605, coupled to a test circuit formed by transistors T1, T2 and T3.

In this example the voltage threshold indicator 605 is a TPOR generator having an input and an output. The TPOR generator has a first current mirror located at the input of the circuit and formed by P-channel transistors MP1 and MP2. A second current mirror formed by N-channel transistors MN1 and MN2 is coupled to the first mirror via a current copier M1. The current copier M1 may be a transistor having a size N times smaller than the size of the transistor MN1.

The first current mirror is coupled to current copier M1 via transistor MP2. An Error node, ERR, located at the output of the circuit, connects a drain of MP2 with a drain of M1. A drain of MP1 is connected to a drain of MN2 hence coupling the first current mirror to the second current mirror. A Resistance Proportional to Absolute Temperature RPTAT is connected at one end to a gate of M1 and at another end to the drain and gate of MN1. A potential divider formed by resistances, RH1, RH2 and RL has an input coupled to a source of MP2 and an output coupled to the gate of transistor M1. The TPOR circuit has a closed loop topology with the output of the TPOR being coupled to its input via transistor T1, T2, T3.

The transistors MN1 and MN2 have each a size N-times larger than transistor M1. The number N is an integer greater than one. The larger N, the smaller the values of the resistances RPTAT, RH1, RH2 and RL. Increasing N means that the physical size of MN1 and MN2 increases, while the size of RPTAT decreases. In an alternative embodiment, the transistor MN2 may have a size different from N-times the size of M1. In this example the transistors are field-effect transistors, FET. Alternatively, bipolar junction transistors, BJT, may be used.

When the TPOR circuit is in a steady state, a current Ia across transistor MN1 is equal to a current Ib across M1. A minor mismatch between Ia and Ib creates a change of the potential $V_{ERR}$. If the current Ia becomes greater than Ib, then a potential $V_{ERR}$ at node ERR increases. As a result, a current Ic across transistors T1, T2 and T3 increases which leads to an increase of a regulation voltage $V_{REG}$ at the input of the TPOR circuit and an increase of a potential VG at node G. Therefore, the current across MN1 increases. Eventually, the circuit stabilizes so that Ia=Ib=Iptat, in which Iptat is a current proportional of absolute temperature.

Similarly, if Ia is less than Ib, then $V_{ERR}$ at node ERR decreases. Thus, the current Ic across transistors T1, T2 and T3 decreases which leads to a decrease of the regulation voltage $V_{REG}$ and a decrease of the potential VG at node G. Therefore, the current across MN1 decreases. Eventually, the circuit stabilizes so that Ia=Ib=Iptat.

Therefore, the circuit 605 regulates the current across the second current mirror formed by MN1 and MN2 such that the current across the second current mirror equals the current across transistor M1. When Ia=Ib the current becomes temperature compensated and the voltage at node ERR can be used to generate a logic signal, such as a logic 1 or a logic 0.

In practice, the test circuit may be used in order to adjust the components RPTAT, RH1, RH2 and RL of the TPOR circuit, such that $V_{REG}$ is temperature compensated. The potential $V_{REG}$ can be derived as:

$$V_{REG} = V_{GS_1}\left(1 + \frac{RH1 + RH2}{RL}\right) + \frac{RH1 + RH2}{R_{PTAT}} V_T \mathrm{Ln}(N) \qquad (1)$$

With $$V_T = \frac{kT}{q},$$

the thermal voltage, and $V_{GS1}$ the gate source voltage across transistor M1.

The term $$V_{GS_1}\left(1 + \frac{RH1 + RH2}{RL}\right)$$

decreases with temperature while the term $$\frac{RH1 + RH2}{R_{PTAT}} V_T \mathrm{Ln}(N)$$

increases with temperature. Temperature compensation of the regulation voltage can be obtained by adjusting the values of RPTAT, RH1, RH2 and RL.

Figure 7:
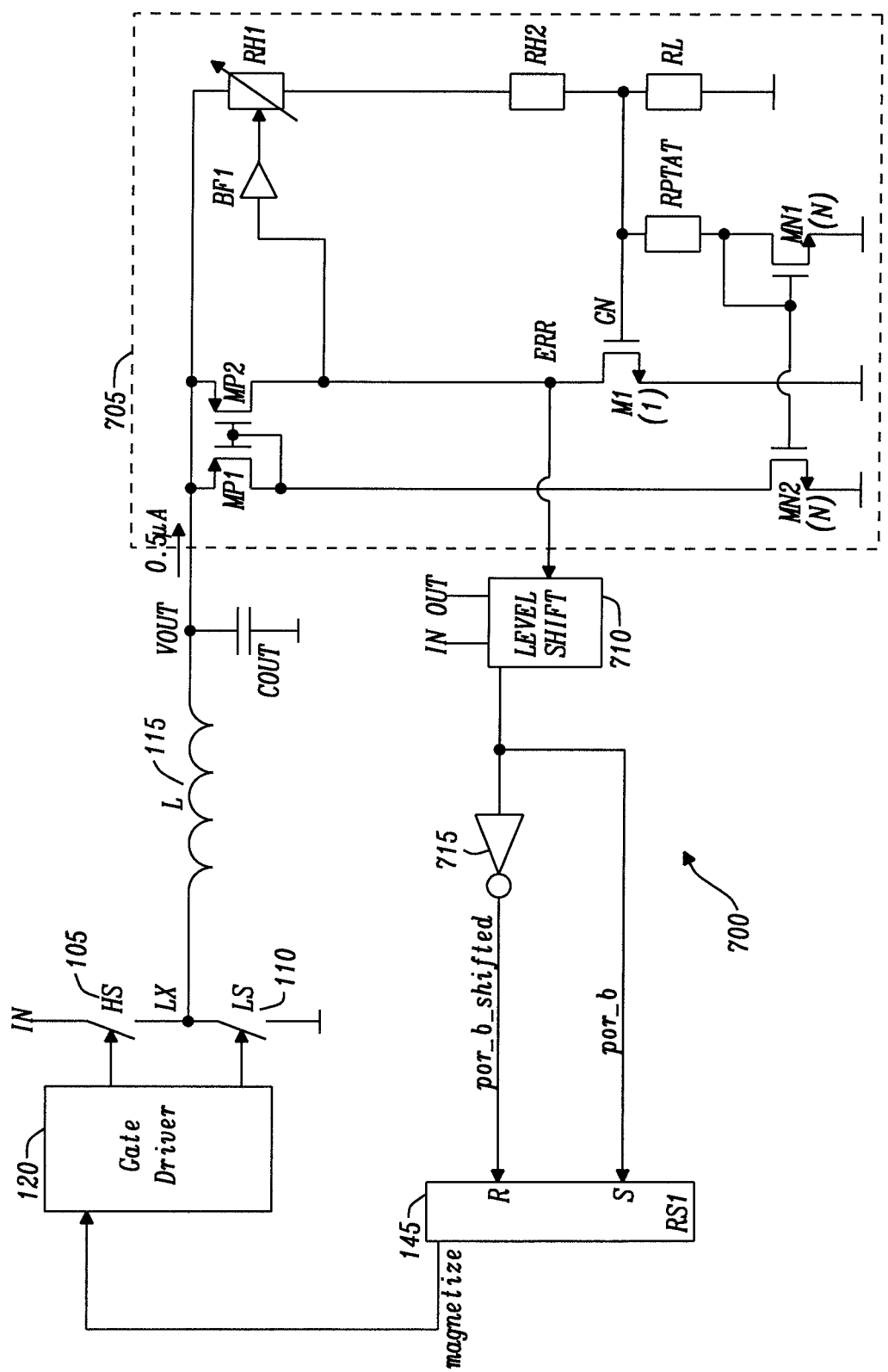
FIG. 7 is a circuit diagram of a buck convert provided with a voltage threshold indicator.

FIG. 7 illustrates a buck converter provided with a voltage threshold indicator 705. The voltage threshold indicator 705 is similar to the circuit described in FIG. 6. In addition, a comparator circuit BF1 is provided between the transistor MP2 and a variable resistor RH1. The comparator circuit BF1 has an input connected to the drain of MP2 and an output connected to the variable resistor RH1. The comparator circuit may be a buffer such as a Schmitt trigger circuit.

The TPOR circuit 705 has an open loop configuration. The input of the TPOR circuit 705 is coupled with the output of the buck converter, while the output of the TPOR circuit is coupled to the memory device 145 via a level shifter 710. An inverter logic gate 715 is coupled between an output of the level shifter 710 and a reset input of the memory device 145.

The current through MN1 is sensed using MN2 and re-applied to M1 using the first current mirror formed by MP1 and MP2. When the current across MN1 becomes equal to the current across M1, the voltage at node ERR swings. At this point, the current flowing through RPTAT is temperature compensated. When the node ERR swings the voltage $V_{OUT}$ can be expressed as:

$$V_{OUT} = V_{GS_1}\left(1 + \frac{RH1 + RH2}{RL}\right) + \frac{RH1 + RH2}{R_{PTAT}} V_T \mathrm{Ln}(N) \qquad (2)$$

As mentioned above with reference to FIG. 6, the components RPTAT, RH1, RH2 and RL of the TPOR circuit can be adjusted, such that $V_{OUT}$ is temperature compensated. The output voltage $V_{OUT}$ is therefore regulated around a temperature compensated voltage value. The voltage threshold indicator outputs a voltage at node ERR which can be used as a control signal. The voltage at node ERR indicates whether $V_{OUT}$ exceeds a threshold voltage defined by equation 2. Such a buck converter has a low quiescent current while maintaining a regulation accuracy in a region of +/−5%.

By changing the values of RH1 it is also possible to adjust the value of $V_{OUT}$. The resistor RH1 is varied to adjust $V_{OUT}$, for example between 1V and 1.05V. This is achieved via the comparator circuit BF1. BF1 is adapted to maintain a certain output value until an input value changes, for example the input value reaches a value above a certain threshold. When the current across MP2 decreases below a certain value, the comparator circuit BF1 changes its output value to increase RH1. When the drain to source current across MP2 increases above a certain value, the comparator circuit BF1 changes its output value to decrease RH1. In this way, BF1 can be used to achieve a hysteresis function.

From equation 2, it can be observed that by changing the value of RH1, the temperature compensation will also be affected. In practice however, such a variation in temperature compensation would be relatively small.

Figure 8:
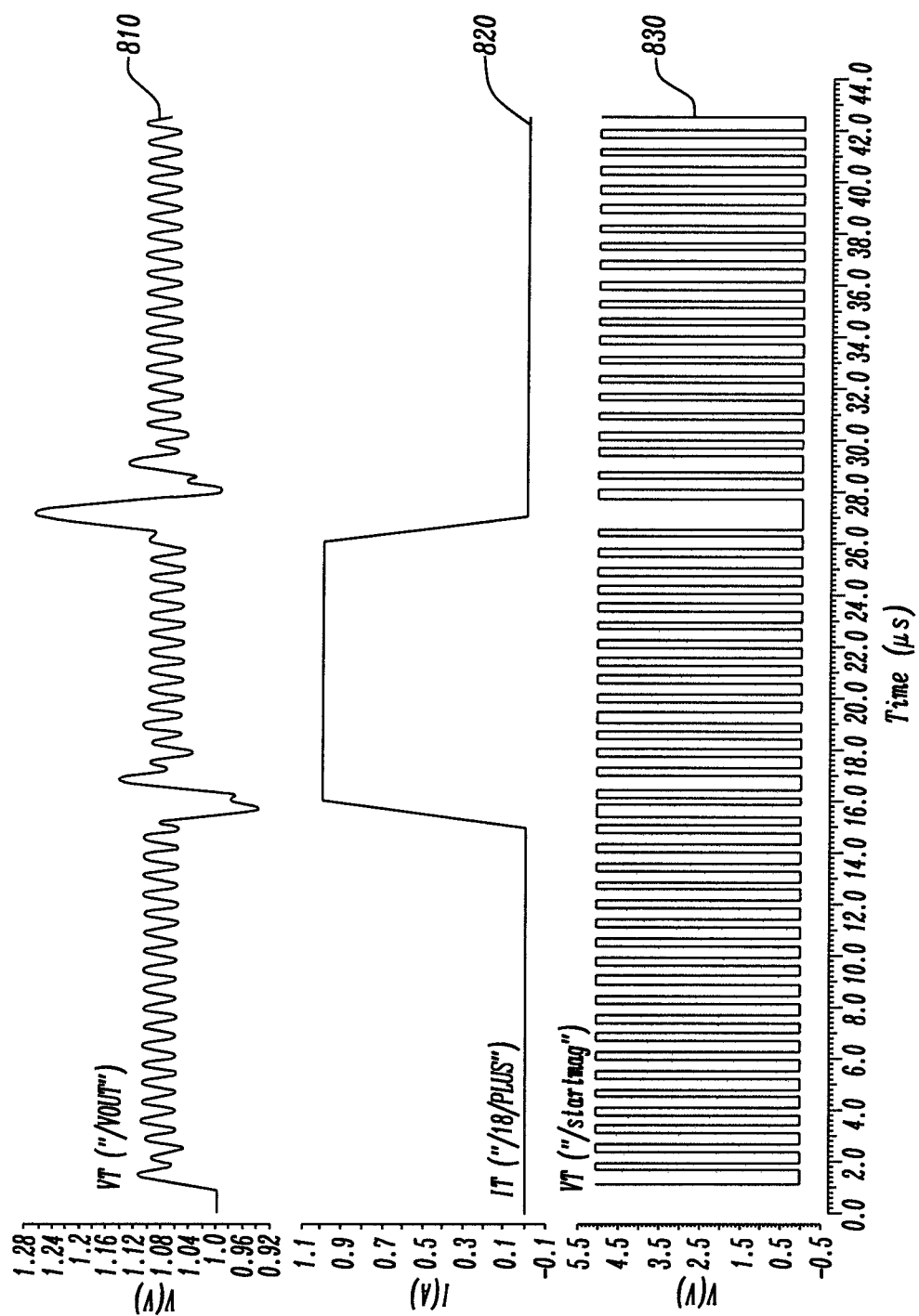
FIG. 8 is a simulation of a hysteretic controller of the buck converter circuit of FIG. 7.

FIG. 8 is a simulation of the hysteretic controller of the buck converter circuit of FIG. 7 showing the profiles of the output voltage $V_{OUT}$ of the buck converter, 810, the load current, 820, and the output voltage of the TPOR circuit at node ERR, 830. This simulation only shows the switching converter operating in CCM mode. However, the hysteretic controller would be ON regardless of the mode of operation, PFM or CCM.

In this simulation, the buck converter steps a voltage down from 3.6V to 1.08V. The transient load varies between 0 and 1 A in 1 μs. Considering an output capacitor and inductor of 1 μF and μH respectively, the TPOR circuit consumes 400 nA and the pulse frequency modulation mode current is 110 nA.

Figure 9:
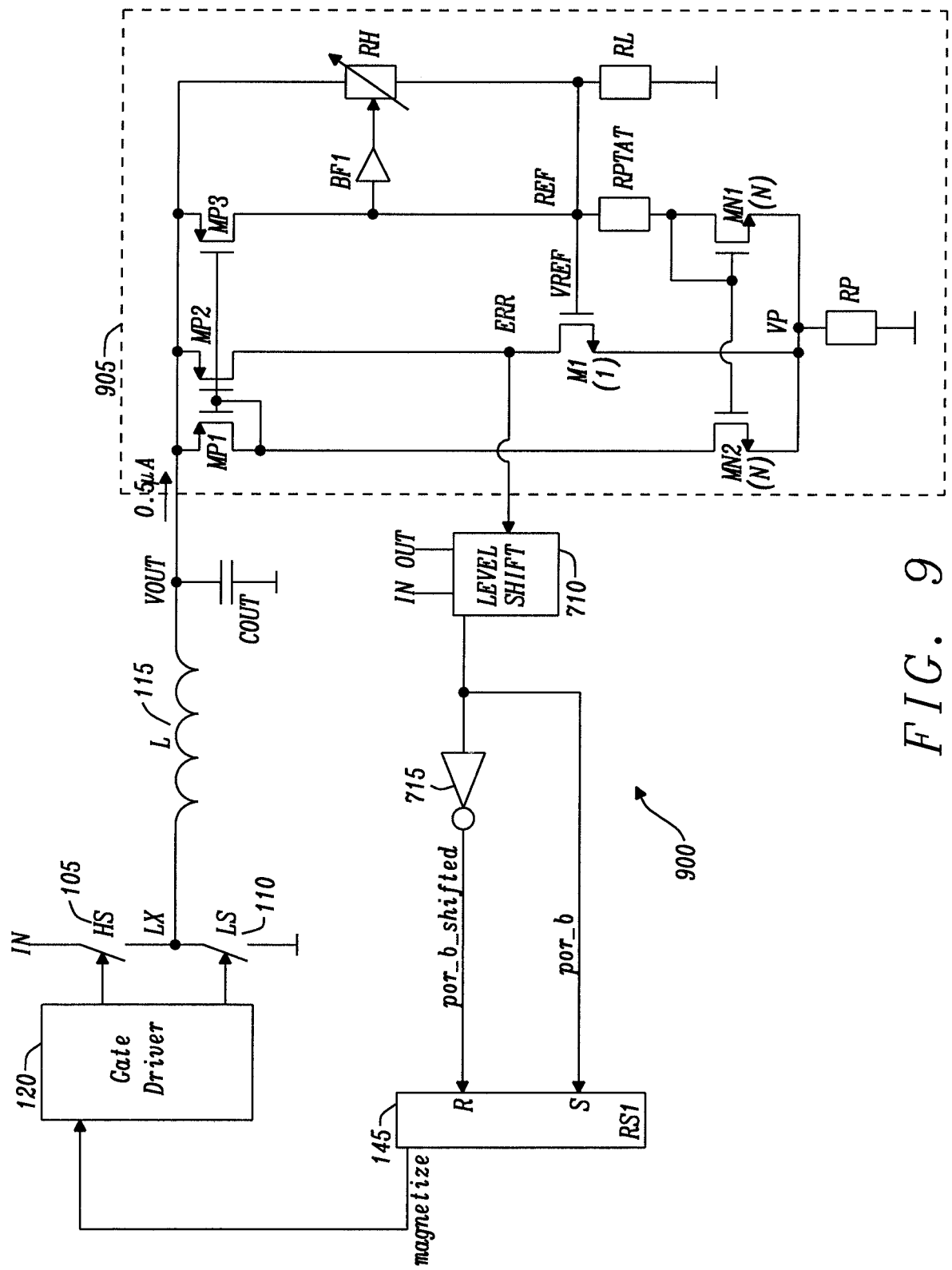
FIG. 9 is a circuit diagram of a buck converter provided with an alternative voltage threshold indicator.

FIG. 9 illustrates a buck converter provided with an alternative TPOR circuit 905.

The TPOR circuit 905 has a first current mirror formed by P-channel transistors MP1 and MP2; and a second current mirror formed by N-channel transistors MN1 and MN2. The transistors MN1 and MN2 have each a size N times larger than transistor M1. Alternatively, the transistor MN2 may have a size different from N times the size of M1. The first current mirror is coupled to transistor M1 via MP2. A drain of MP2 is connected to a drain of M1. A drain of MP1 is connected to a drain of MN2 hence coupling the first current mirror to the second current mirror. A Resistance Proportional to Absolute Temperature RPTAT is connected at one end to a gate of M1 and at another end to the gate and drain of MN1.

An additional transistor MP3 has a gate connected to the gate of MP2, and a drain connected to the gate of M1. A reference node REF connects together the drain of MP3, a terminal of RPTAT and the gate of M1. A potential divider, also referred to as resistive ladder, is formed by resistor RH connected in series resistor RL. The potential divider has an input connected to a source of MP3 and an output connected to the gate of transistor M1. A resistor Rp is connected at one end to the sources of transistor MN1 and MN2 and at another end to a ground.

When the error node ERR swings, a current proportional to absolute temperature, $I_{PTAT}$ flows across the transistors M1, MP2, MP1, MN2, MN1 and MP3. The current $I_{PTAT}$ can be expressed as follows:

$$I_{PTAT} = V_T \left( \frac{Ln(N)}{R_{PTAT}} \right) \quad (3)$$

Since the current $I_{PTAT}$ flows through the three transistors MN1, M1 and MN2, the voltage $V_P$ across $R_P$ can be derived as:

$$V_P = R_P 3 I_{PTAT} = 3 V_T \left( \frac{R_P}{R_{PTAT}} \right) Ln(N) \quad (4)$$

A voltage $V_{REF}$ at the reference node REF may be derived as:

$$V_{REF} = V_P + V_{GS_1} = 3 V_T \left( \frac{R_P}{R_{PTAT}} \right) Ln(N) + V_{GS_1} \quad (5)$$

By adjusting the values of N, $R_P$, and $R_{PTAT}$, it is possible to obtain a temperature compensated voltage reference $V_{REF}$.

Since the current $I_{PTAT}$ is the same across $R_{PTAT}$, and MP3, this means that no current flows from the output of the potential divider formed by RH and RL. Therefore, the voltage $V_{REF}$ can be expressed as:

$$V_{REF} = \left( \frac{R_L}{R_H + R_L} \right) V_{OUT} \quad (6)$$

The voltage $V_{OUT}$ can therefore be derived as:

$$V_{OUT} = \left( 1 + \frac{R_H}{R_L} \right) \left( 3 V_T \left( \frac{R_P}{R_{PTAT}} \right) Ln(N) + V_{GS_1} \right) \quad (7)$$

The term $$\left( 1 + \frac{R_H}{R_L} \right)$$

is a function of $R_H$ but does not vary with temperature.
The term $$V_{REF} = 3 V_T \left( \frac{R_P}{R_{PTAT}} \right) Ln(N) + V_{GS_1}$$

is a function of temperature but not a function of $R_H$. Therefore $R_H$ may be varied to adjust $V_{OUT}$, without affecting the temperature compensation of the voltage reference.

Figure 10:
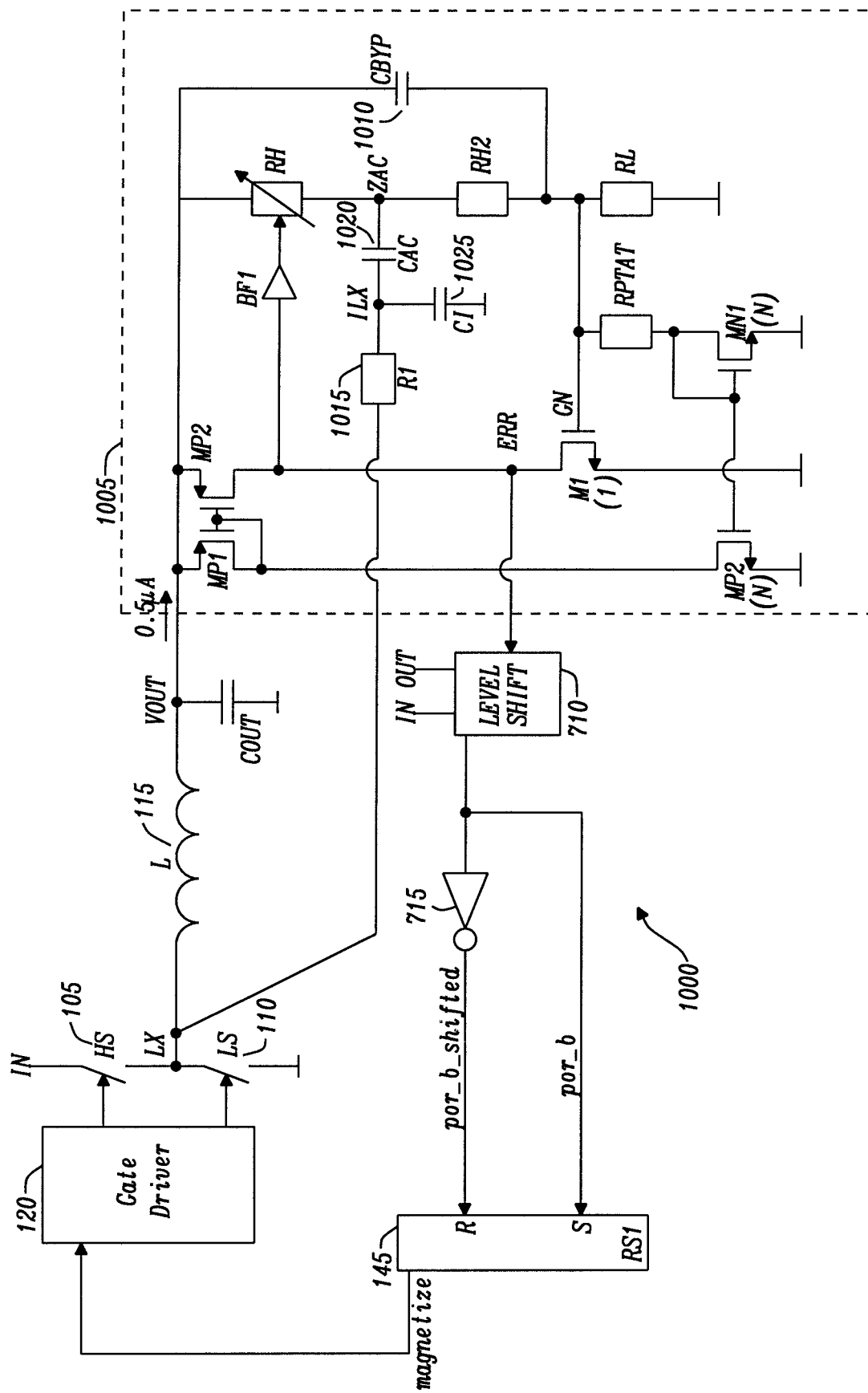
FIG. 10 is a modified version of the circuit diagram of FIG. 7.

FIG. 10 illustrates a modification of the circuit of FIG. 7, allowing to speed up a reaction time of the circuit when the converter is operated in pulse frequency modulation mode.

In this example a bypass capacitor CBYP 1010 is provided in parallel with resistance RH1 and RH2. An RC filter formed by resistance R1, 1015, and capacitor C1, 1020, is provided between the Lx node and an intermediate node ZAC located between the variable resistor RH1 and resistor RH2. A capacitor CAC, 1025, is provided between the RC filter and the node ZAC.

The RC filter is used to integrate a difference between the potential at node Lx and $V_{OUT}$. A node ILx between resistance R1 and capacitor CAC displays a voltage which reflects the AC content of the inductor current at node Lx. This voltage is applied at the intermediate node ZAC via the capacitor CAC. Using this additional circuit, it is possible to emulate the behaviour of an Equivalent Series Resistance, ESR, on the output capacitor Cout, hence compensating the hysteretic converter.

The additional circuit formed by the bypass capacitor CBYP 1010, the R1/C1 filter, and capacitor CAC could also be implemented in the circuit of FIG. 9, or in other voltage threshold indicator circuits.

A skilled person will appreciate that variations of the disclosed arrangements are possible without departing from the disclosure. In particular the disclosure is not limited to buck converters. The teaching of the disclosure could also be applied to other types of switching converters such as boost and buck-boost converters. Accordingly, the above description of the specific embodiment is made by way of example only and not for the purposes of limitation. It will be clear to the skilled person that minor modifications may be made without significant changes to the operation described.

What is claimed is:

1. A power supply comprising
   a switching converter for providing an output voltage comprising a power switch coupled to a driver for driving the power switch with an on-off switching cycle; and
   a feedback loop comprising a temperature compensated voltage indicator and a memory device coupled to the driver,
   wherein the temperature compensated voltage indicator comprises an input for receiving an output of the converter, and an output coupled to the memory device, the temperature compensated voltage indicator being adapted to provide a temperature compensated voltage threshold that remains substantially constant with temperature and a control signal to control the on-off switching cycle,
   wherein the temperature compensated voltage indicator comprises a first current mirror coupled to a second current mirror and a resistance proportional to absolute temperature, the temperature compensated voltage indicator being adapted to adjust a current flowing through the first current mirror, the second current mirror and the resistance proportional to absolute temperature based on the output voltage such that when the output voltage exceeds the temperature compensated voltage threshold, a value of the control signal changes to regulate the output voltage around the temperature compensated voltage threshold.

2. The power supply as claimed in claim 1, wherein the control signal is adapted to change an operation of the switching converter between a first state in which the power switch is switched on and off alternately, and a second state in which the power switch is switched off.

3. The power supply as claimed in claim 1, wherein the temperature compensated voltage indicator is adapted to provide a first logic signal to set the memory device, and a second logic signal to reset the memory device, wherein the first and second logic signals derive from the control signal, the first logic signal being configured to set the memory device when the output voltage decreases to reach a first threshold value, and the second logic signal being configured to reset the memory device when the output voltage increases to reach a second threshold value.

4. The power supply as claimed in claim 1, wherein the temperature compensated voltage indicator is adapted to provide hysteretic control of the switching converter.

5. The power supply as claimed in claim 1, further comprising at least one energy consuming circuit element.

6. The power supply as claimed in claim 5, wherein the at least one energy consuming circuit element comprises a current comparator.

7. The power supply as claimed in claim 5, further comprising a controller coupled to the output of the temperature compensated voltage indicator; the controller being switchable between a first state in which the controller outputs a first control signal to turn on at least one energy consuming circuit element, and a second state in which the controller outputs a second control signal to turn off at least one energy consuming circuit element.

8. The power supply as claimed in claim 1, wherein a size of the second current mirror is a number of times a size of the first current mirror, wherein the number is at least two or more.

9. The power supply as claimed in claim 1, wherein the temperature compensated voltage indicator comprises a current copier, wherein the first current mirror is coupled to the second current mirror via the current copier, and a potential divider comprising an input coupled to the first current mirror and an output coupled to the current copier.

10. The power supply as claimed in claim 9, wherein the potential divider comprises a variable resistor; and wherein the temperature compensated voltage indicator comprises a comparator circuit coupled between the first current mirror and the variable resistor, the comparator circuit being adapted to output a signal to change a value of the variable resistor.

11. The power supply as claimed in claim 1, wherein the temperature compensated voltage indicator comprises another switch having a first terminal coupled to the first current sensor and a second terminal coupled to the resistance proportional to absolute temperature.

12. A method of operating a power supply comprising a switching converter for providing an output voltage, the method comprising
   providing a feedback loop comprising a temperature compensated voltage indicator and a memory device; the temperature compensated voltage indicator being adapted to receive an output of the converter and to provide a temperature compensated voltage threshold that remains substantially constant with temperature and a control signal to control an on-off switching cycle of the switching converter,
   wherein the temperature compensated voltage indicator comprises a first current mirror coupled to a second current mirror and a resistance proportional to absolute temperature, the temperature compensated voltage indicator being adapted to adjust a current flowing through the first current mirror, the second current mirror and the resistance proportional to absolute temperature based on the output voltage such that when the output voltage exceeds the temperature compensated voltage threshold, a value of the control signal changes to regulate the output voltage around the temperature compensated voltage threshold.

13. The method as claimed in claim 12, further comprising the step of:
   changing an operation of the switching converter between a first state in which the power switch is switched on and off alternately, and a second state in which the power switch is switched off.

14. The method as claimed in claim 12, wherein the temperature compensated voltage indicator is adapted to provide a first logic signal to set the memory device, and a second logic signal to reset the memory device, wherein the first and second logic signals derive from the control signal, the first logic signal being configured to set the memory device when the output voltage decreases to reach a first threshold value, and the second logic signal being configured to reset the memory device when the output voltage increases to reach a second threshold value.

15. The method as claimed in claim 14 further comprising the steps of:
   providing a controller comprising an input coupled to the temperature compensated voltage indicator and an output coupled to at least one energy consuming circuit element; and
   turning off at least one energy consuming circuit element when the output voltage increases beyond the second threshold value.

16. The method as claimed in claim 15, further comprising the step of:
   turning on at least one energy consuming circuit element when the output voltage decreases below the first threshold value.

* * * * *